United States Patent
Moustafa Abdelrazek et al.

(10) Patent No.: US 10,700,617 B1
(45) Date of Patent: Jun. 30, 2020

(54) BOOSTING MODULAR MULTILEVEL CONVERTER

(71) Applicant: ABB Schweiz AG, Baden (CH)

(72) Inventors: Ahmed Abdelhakim Moustafa Abdelrazek, Västerås (SE); Cicero Postiglione, Västerås (SE); Frans Dijkhuizen, Skultuna (SE)

(73) Assignee: ABBSchweiz AG, Baden (CH)

( * ) Notice: Subject to any disclaimer, the term of this patent is extended or adjusted under 35 U.S.C. 154(b) by 0 days.

(21) Appl. No.: 16/563,425

(22) Filed: Sep. 6, 2019

(51) Int. Cl.
*H02M 7/483* (2007.01)
*H02M 7/537* (2006.01)

(52) U.S. Cl.
CPC .......... *H02M 7/483* (2013.01); *H02M 7/537* (2013.01); *H02M 2007/4835* (2013.01)

(58) Field of Classification Search
CPC ........ H02M 7/483; H02M 7/49; H02M 7/493; H02M 7/537; H02M 7/5387; H02M 2007/4835
See application file for complete search history.

(56) References Cited

U.S. PATENT DOCUMENTS

| | | | | |
|---|---|---|---|---|
| 2012/0223583 | A1* | 9/2012 | Cooley | H02J 3/385 307/82 |
| 2015/0108844 | A1* | 4/2015 | Zhou | H02J 9/062 307/80 |
| 2017/0012521 | A1* | 1/2017 | Jimichi | H02M 7/483 |
| 2018/0013339 | A1* | 1/2018 | Gotz | H02M 1/08 |

* cited by examiner

*Primary Examiner* — Gary L Laxton
*Assistant Examiner* — Ivan Laboy
(74) *Attorney, Agent, or Firm* — Whitmyer IP Group LLC (57) ABSTRACT

A converter converting between a dc voltage at a first voltage level and at least one waveshape at a second higher voltage level has a primary connection port for the dc voltage, one secondary connection port for each waveshape, and one stack of cells for each secondary port. Each stack includes n cells connected in cascade between the primary port and the corresponding secondary port. At least (n−1) of the cells in a stack have: first, second, third, and fourth terminals, a first energy storage, and first, second, and third switches, where the first energy storage is connected in parallel with the first and second switches, the first terminal is provided at a junction between the first energy storage and the first switch, and the second terminal is provided at a junction between the first energy storage element, the second switch and the third switch.

18 Claims, 5 Drawing Sheets

BOOSTING MODULAR MULTILEVEL CONVERTER

FIELD OF INVENTION

The present invention generally relates to converters. More particularly the present invention relates to a converter for converting between a dc voltage at a first voltage level and a waveform at a second higher voltage level as well as to a cell of such a converter.

BACKGROUND

Different applications related to dc-ac conversion such as motor drives and grid connected applications, including UPS systems, can be fed by fuel-cells, photovoltaic (PV) panels, batteries or other low-voltage (LV) dc sources. Because of this it is of interest to use low-voltage metal oxide semiconductor field effect transistors (MOSFETs). Quite often the dc input is not sufficient to meet the ac side requirements. Therefore, a step-up converter in series with an inverter is often employed.

In many cases, high-voltage gain converters, such as voltage multiplier or isolated solutions, are mandatory and this highly affects the efficiency of the system. This is particularly true for fuel-cell applications, as the output voltage is very low. On the other hand, the inversion stage typically uses high-voltage rating semiconductor devices, MOSFETs or IGBTs, depending on the voltage and the power levels of the targeted application. Such utilization of high-voltage semiconductor devices leads to significant switching and conduction losses, resulting in a deteriorated system efficiency.

Connecting low-voltage dc sources to ac systems usually requires an additional step-up conversion stage before inversion is made to ac. Such additional stage brings extra complexity, conversion losses, and cost to the entire power conversion system. Furthermore, high-voltage Insulated-Gate Bipolar Transistors (IGBTs) are often required in the inverter, which introduces higher switching and conduction losses. In other words, the utilization of low-voltage MOSFETs and benefiting from their low ON-state resistance is quite limited. Moreover, there are often output filter requirements that are quite challenging and the use of output filters significantly contributes in system losses.

There is therefore a need for an improvement regarding one or more of the above-mentioned issues.

SUMMARY OF THE INVENTION

The present invention is directed towards solving at least some of the above-mentioned problems.

This is according to a first aspect achieved through a converter converting between a dc voltage at a first voltage level and at least one waveshape at a second higher voltage level, the converter having a primary connection port for the dc voltage, one secondary connection port for each waveshape and one stack of cells for each secondary connection port of the converter. Each stack comprises n cells connected in cascade between the primary connection port and the corresponding secondary connection port, where at least (n−1) of the cells in a stack have a first, second, third and fourth cell terminal, where the first and second cell terminals are closer to the primary connection port than the third and fourth cell terminals, a string of energy storage elements comprising a first energy storage element and a string of switches comprising a first, second and third switch, where the first energy storage element is connected in parallel with the first and second switches, the first cell terminal is provided at a junction between the first energy storage element and the first switch, the second cell terminal is provided at a junction between the first energy storage element, the second switch and the third switch, a junction between the first and the second switches is connected to the third cell terminal and the third switch is connected to the fourth cell terminal.

The switches in the string of switches may be connected in series with each other. In this case the first energy storage element is connected in parallel with the series-connection of the first and second switches.

The primary connection port may be connected to the first and second cell terminals of the first cell of each stack and the secondary connection port of each stack may be formed between the third cell terminal of the last cell in the stack and ground.

It is possible that the voltages of the first energy storage elements of a stack decrease between cells in the direction from the bottom towards the top of the stack.

The last cell in each stack, which may be the cell at the top of the stack, may only comprise the first, second and third cell terminals s only comprises the first and second switch in the string of switches.

At least the first (n−1) cells in a stack may furthermore comprise an inductor connected between the third cell terminal and the junction between the first and the second switches.

In the cell the disabling the forming of a waveshape on the corresponding secondary connection port and discharging the energy of the energy storage element into the energy storage element of the following cell may be made when the first and third switches are turned on.

The string of switches of at least the first (n−1) cells in a stack may, furthermore, comprise a fourth switch and the string of energy storage elements may, furthermore, comprise a second energy storage element, where the fourth cell terminal may be provided at a junction between the third and fourth switches, the second energy storage element may be connected to the junction between the first energy storage element, the second switch and the third switch as well as is connected to the fourth switch.

In the string of switches of a cell in a stack, the first switch may be controllable to disable contributions from the first energy storage element in the forming of a waveshape on the corresponding secondary connection port and the third switch may be controllable to discharge the first energy storage element into an energy storage element of the following cell. The disabling in the forming of a waveshape on the corresponding secondary connection port and the discharging of the energy of the energy storage element into the energy storage element of the following cell may be made when the first and third switches are turned on.

In the string of switches of a cell, the second switch may be controllable to cause the cell to contribute the voltage of the energy storage element to the forming of the waveshape on the corresponding secondary connection port. The forming of a waveshape may be made when the second switch is turned on.

At least one cell in the stack may further comprise a bypass switch connected between the first and the third cell terminal and controllable to bypass the cell. This bypass may be made in case the cell is faulty. The bypass switch may be mechanical. However, it is also possible with an electronic switch.

The converter may also comprise a control unit.

In the control, the control unit may control a number k cells of a stack to contribute to the forming of a waveshape on a corresponding secondary connection port and to control a number (n-k) cells in the stack to refrain from contributing to the waveshape and to discharge the energy storage element to the following cell or the corresponding secondary connection port.

There may additionally be three stacks each connected between the primary connection port and a corresponding secondary connection port, where the first cell terminals of the first cell in each stack are interconnected and the second cell terminals of the first cells in each stack are interconnected.

The third cell terminal of a cell in a stack may be connected to the first cell terminal of a following cell in the stack and the fourth cell terminal of the cell is connected to the second cell terminal of the following cell in the stack.

The above-mentioned problem is also addressed through a cell for use in a converter converting between a dc voltage with a first voltage level at a primary connection port and at least one waveshape with a second higher voltage level at a corresponding secondary connection port, the cell having a first, second, third and fourth cell terminal, a string of energy storage elements comprising a first energy storage element and a string of switches comprising a first, second and third switch, where the first energy storage element is connected in parallel with the first and second switches, the first cell terminal is provided at a junction between the energy storage element and the first switch, the second cell terminal is provided at a junction between the first energy storage element, the second switch and the third switch, a junction between the first and the second switches is connected to the third cell terminal and the third switch is connected to the fourth cell terminal and the first and second cell terminals are closer to the primary connection port than the third and fourth cell terminals.

The invention has a number of advantages. It is compact and provides modularity. It avoids the separation into a boosting stage and a converting stage. Moreover, the modularity provides flexibility in that the adaption to different voltage levels can easily be made. Through the modularity, redundancy can also easily be introduced. As there is only one stage, the efficiency is also good.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will in the following be described with reference being made to the accompanying drawings, where.

DETAILED DESCRIPTION OF THE INVENTION

In the following, a detailed description of preferred embodiments of the invention will be given.

Figure 1:
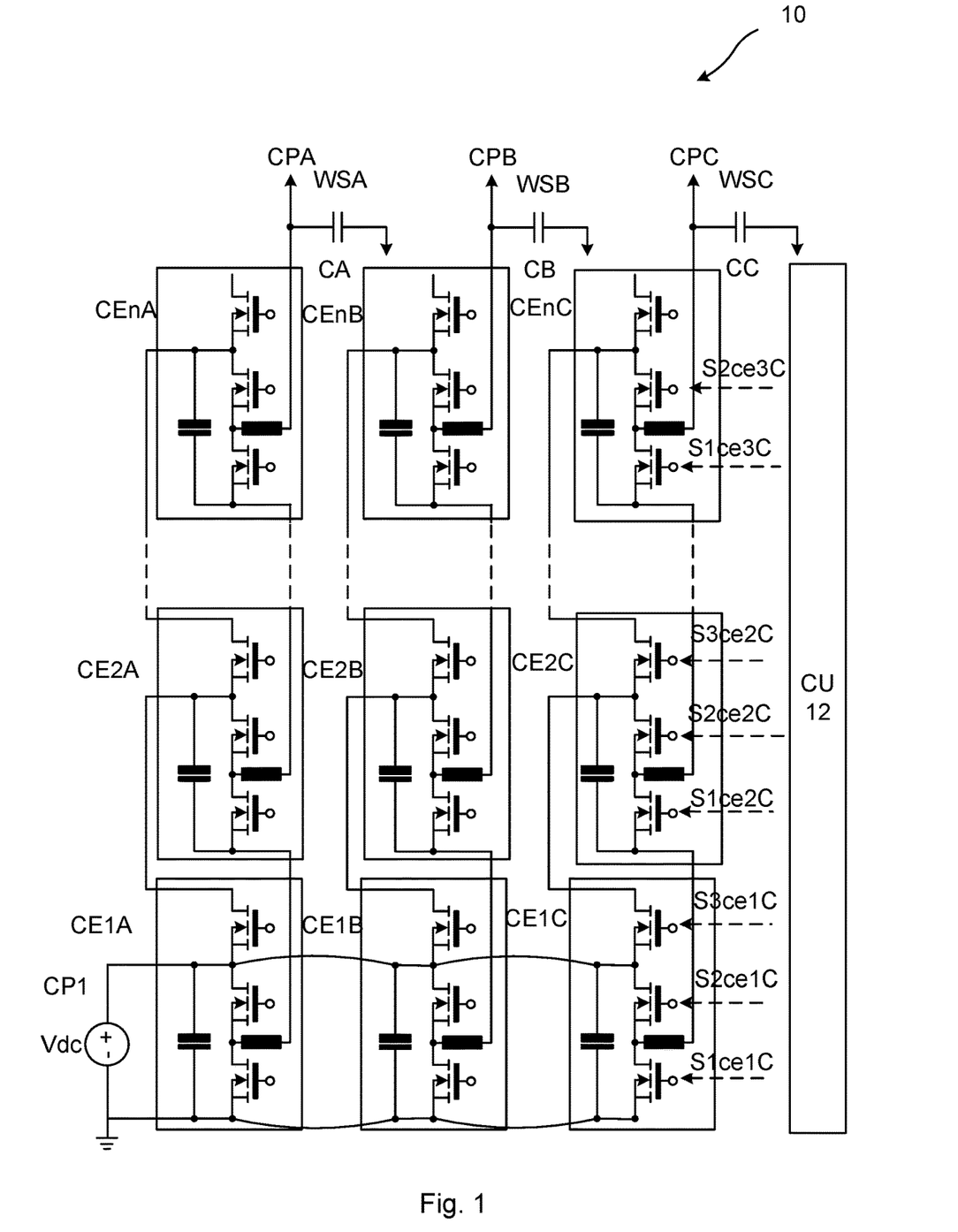
FIG. 1 schematically shows a converter having three stacks of cells connected between a primary connection port and three secondary connection ports, FIG. 2 schematically shows a first cell realization used in the converter of FIG. 1 for unidirectional power flow, FIG. 3 schematically shows a first and a second cell according to the first cell realization in the converter of FIG. 1, when the first cell is in a bypass and energy discharge mode, FIG. 4 schematically shows the first and second cells in the converter of FIG. 1, when the first cell is in a waveshape contributing mode, and FIG. 5 schematically shows a second type of cell for bidirectional power flow, and FIG. 6 schematically shows a variation of the first type of cell equipped with a bypass switch.

FIG. 1 shows a first realization of a converter 10 for converting between a dc voltage Vdc at a first voltage level and at least one waveform WSA, WSB and WSC at a second higher voltage level.

The converter 10 comprises a first stack of n cells CE1A, CE2A, ... CEnA. Where n is an integer with a number that is suitable for converting between the two voltage levels. There is also a second stack of n cells CE1B, CE2B, ..., CEnB and a third stack of n cells CE1C, CE2C, ..., CEnC. The cells of each stack are connected in cascade. Thereby the converter is also a modular multilevel converter (MMC). Each cell comprises a first energy storage element. It is possible that the voltages of the first energy storage elements of a stack decrease between cells in the direction from the bottom towards the top of the stack.

The converter 10 also comprises a primary connection port CP1 for the dc voltage and a number of secondary connection ports CPA, CPB and CPC, one for each stack, where each secondary connection port is provided for a corresponding phase, such as a corresponding alternating current (ac) phase. There is thereby also one secondary connection port for each waveshape and one stack of cells for each secondary connection port. A stack is thereby also connected in cascade between the primary connection port and its corresponding secondary connection port. The primary connection port CP1 has a signal terminal having a first dc voltage Vdc. In this case the primary connection port CP1 also has a ground terminal. The primary connection port applies this voltage Vdc to an input of a first cell CE1A, CE1B and CE1C of each stack. A first secondary connection port CPA of a first stack provides a waveshape WSA between itself and ground. At the secondary connection port CPA there is also a capacitor CA connected between the connection port and ground. Thereby the first stack has a first secondary connection port CPA with a first waveshape WSA between this connection port CPA and ground. The second stack has a second secondary connection port CPB with a second waveshape WSB between this connection port CPB and ground. At this secondary connection port CPB there is also a capacitor CB connected between the connection port and ground. Also, the third stack has a third secondary connection port CPC with a third waveshape WSC between this connection port CPC and ground. At the secondary connection port CPC there is also in this case a capacitor CC connected between the connection port and ground.

The primary connection port CP1 is additionally provided at one end of each stack and also connected to the first and second cell terminals of the first cell of each stack, where these ends of the stacks are interconnected. Moreover, it can be seen that one terminal of the primary connection port may also be grounded. Each secondary connection port may therefore also be viewed as provided across the whole of the corresponding stack.

In FIG. 1 there is also a control unit 12, which is shown as controlling the switches of the third stack. From the bottom to the top in each cell there is a first, second and third switch. As can be seen the control unit 12 sends a first control signal S1ce1C to a first switch in the first cell CE1C, a second control signal S2ce1C to a second switch in the first cell CE1C and a third control signal S3ce1C to a third switch in the first cell CE1C. The control unit 12 also sends a first control signal S1ce2C to a first switch in the second cell CE2C, a second control signal S2ce2C to a second switch in the second cell CE2C and a third control signal S3ce2C to a third switch in the second cell CE2C. Finally, it can be seen that the control unit 12 sends a first control signal S1cenC to a first switch in an nth cell CEnC and a second control signal S2cenC to a second switch in the nth cell CEnC, where the nth cell is the cell at the top of the stack. The first and third signal in the example given above may be the same signal.

Although control is only shown for the third stack, it should be realized that control signals are also sent by the control unit 12 to the switches in the other stacks.

Figure 2:
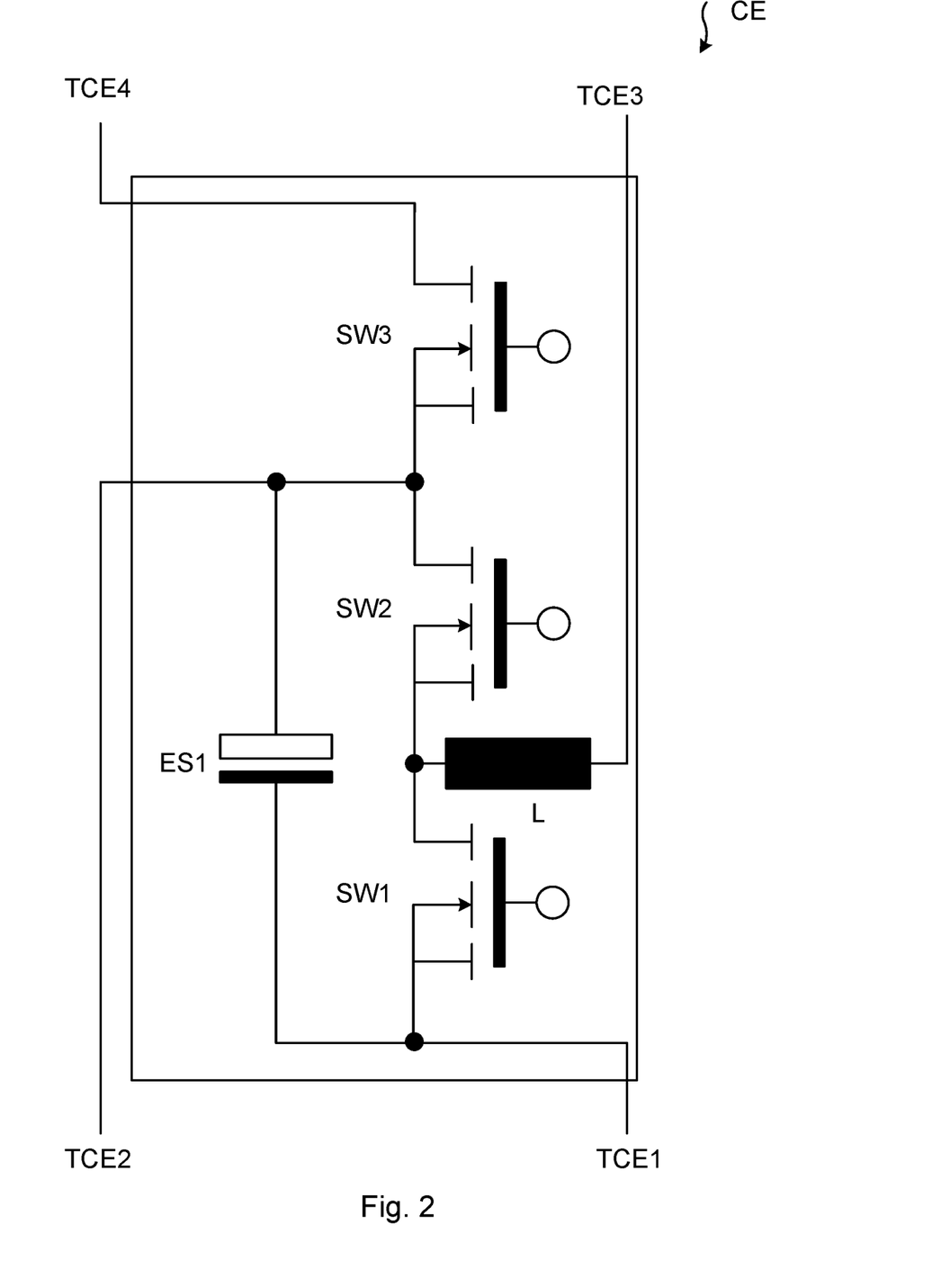

As can be seen in FIG. 2 each cell CE comprises a string of energy storage elements comprising a first energy storage element ES1. Each cell also comprises a string of switches comprising a first, second and third switch SW1, SW2 and SW3. The first switch SW1 has a first end connected to a first end of the first energy storage element ES1 and a second end connected to the first end of the second switch SW2. The second switch SW2 has a second end connected to a first end of the third switch SW3, The first energy storage element ES1 also has a second end connected to the second end of the second switch SW2 and to the first end of the third switch SW3. Thereby the first energy storage element ES1 is also connected in parallel with the series connection of first and second switches SW1 and SW2.

The cell also comprises four cell terminals TCE1, TCE2, TCE3 and TCE4, where the first cell terminal TCE1 is connected to a junction between the first energy storage element ES1 and the first switch SW1, the second cell terminal TCE2 is connected to a junction between the first energy storage element ES1, the second switch SW2 and the third switch SW3. It can also be seen that a junction between the first and second switches SW1 and SW2 has a connection to the third cell terminal TCE3, which in this case is a connection via an inductor L. It can finally be seen that the third switch SW3 is connected to the fourth cell terminal TCE4, where in this case the connection is made via the second end of the third switch SW3.

As was mentioned above, the converter 10 comprises a number of stacks of cascaded cells, where each cell is provided according to the above-mentioned first realization. As can be seen in FIG. 1, the first and second cell terminals TCE1 and TCE2 of the first cell CE1A are connected to the primary connection port CP1. It can furthermore be seen that the third cell terminal TCE3 of the first cell CE1A is connected to the first cell terminals TCE1 of the second cell CE2A in the direction away from the bottom of the stack and the fourth cell terminal TCE4 of the first cell CE1A is connected to second cell terminal TCE2 of the second cell CE2A. Thereby the third cell terminal TCE3 of a certain cell in a certain position in the stack is connected to the first cell terminal TCE1 of a following cell in the stack and the fourth cell terminal of this certain cell is connected to the second cell terminal TCE2 of the following cell, where the following cell is a following cell in the direction towards the top of the stack. In an analog manner, the first cell terminal TCE1 of a certain cell in a certain position in the stack is connected to the third cell terminal TCE3 of a following cell and the second cell terminal TCE2 of the certain cell is connected to a fourth cell terminal of this following cell, where the following cell is a following cell in the direction towards the bottom of the stack. The following cell in the direction towards the top of the stack may also be termed a succeeding cell, while a following cell in the direction towards the bottom of the stack may be termed a preceding cell.

One observation that can be made is that the first and second cell terminals of a cell are closer to the primary connection port than the third and fourth cell terminals of the cell.

It can also be seen that for the nth cell CEnA at the top of the stack, the third connection terminal is connected to the secondary connection port CPA, while the top cell terminal TCE4 is non-connected. Thus, the third switch SW3 connected to it is therefore not used. It is consequently possible to omit the third switch SW3 from the top cell of each stack. Here it can be mentioned that also the inductor L of this last cell at the top of the stack may be removed or omitted.

Thereby, the last cell in each stack may only comprise the first, second and third cell terminals and the string of switches may only comprise the first and second switch. The secondary connection port of each stack may in this case also be formed between the third cell terminal of the last cell in the stack and ground.

It can also be seen that the first cell terminals of the first cells of all stacks are interconnected and the second cell terminals of the first cells in all stacks are interconnected.

From this, it is furthermore clear that as each stack comprises n cells, at least (n−1) of the cells in a stack have a first, second, third and fourth cell terminal, where the first and second cell terminals are closer to the primary connection port than the third and fourth cell terminals. It is also clear that at least the first (n−1) cells in a stack comprise an inductor connected between the third cell terminal and the junction between the first and the second switches.

The cells have two operation modes; a waveshape contribution mode, in which the second switch is activated or turned on, and a bypass and energy discharge mode in which the first and third switches are activated or turned on. In the waveshape contribution mode a cell contributes to the forming of the waveshape on the corresponding secondary port and in the bypass and energy discharge mode the cell is disabled from contributing to the voltage of the waveshape and instead discharges energy to the following cell in the stack, which as an example may be the following cell in the direction towards the secondary port.

Figure 3:
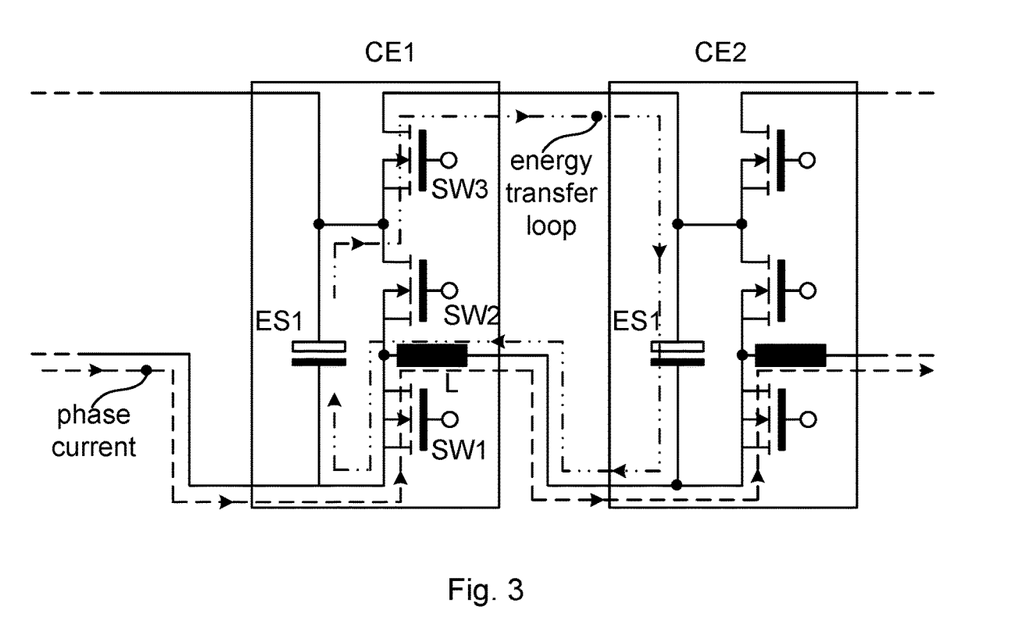

The bypass and energy discharge mode as applied on a first cell CE1, which first cell is connected to a following, here second cell CE2, in a stack, is schematically shown in FIG. 3. The operation is also disclosed for a first current direction, where a current runs from the primary connection port to the secondary connection port of a stack.

In the bypass and energy discharge mode the first and third switches SW1 and SW3 are turned on and the second switch SW2 is turned off. As can be seen in FIG. 3 a phase current that runs from the primary connection port towards the secondary connection port thereby enters the first cell CE1 at the first cell terminal TE1 and then passes via the first switch SW1 and the inductor L to the third cell terminal TE3 and thereafter enters the second cell CE2 via its first cell terminal TE1. Thereby the phase current does not pass through the first energy storage element ES1 but bypasses it. Consequently, the first energy storage element ES1 is bypassed and does not contribute to the forming of the waveshape on the secondary port. It can also be seen that when the first and third switches SW1 and SW3 in the first cell CE1 are closed, a closed current loop is formed between the first energy storage element ES1 in the first cell CE1 and the first energy storage element ES1 in the second cell CE2.

The loop thereby comprises the first energy storage element ES1 in the first cell CE1, the third switch SW3 in the first cell CE1, the first energy storage element ES1 in the second cell CE2 the inductor L in the first cell CE1 and the first switch SW1 in the first cell CE1. If now the voltage of the first energy storage element ES1 in the first cell CE1 is higher than the voltage of the first energy storage element ES1 in the second cell CE2, energy of the first energy storage element ES1 in the first cell CE1 is discharged into the first energy storage element ES1 in the second cell CE2. The third switch SW3 may be floating and operating under zero voltage switching (ZVS) condition for a synchronous rectification mode.

It can thus be seen that the first switch is controllable to disable contributions from the first energy storage element in the forming of a waveshape on the corresponding secondary connection port and the third switch is controllable to discharge the first energy storage element into an energy storage element of the following cell.

Figure 4:
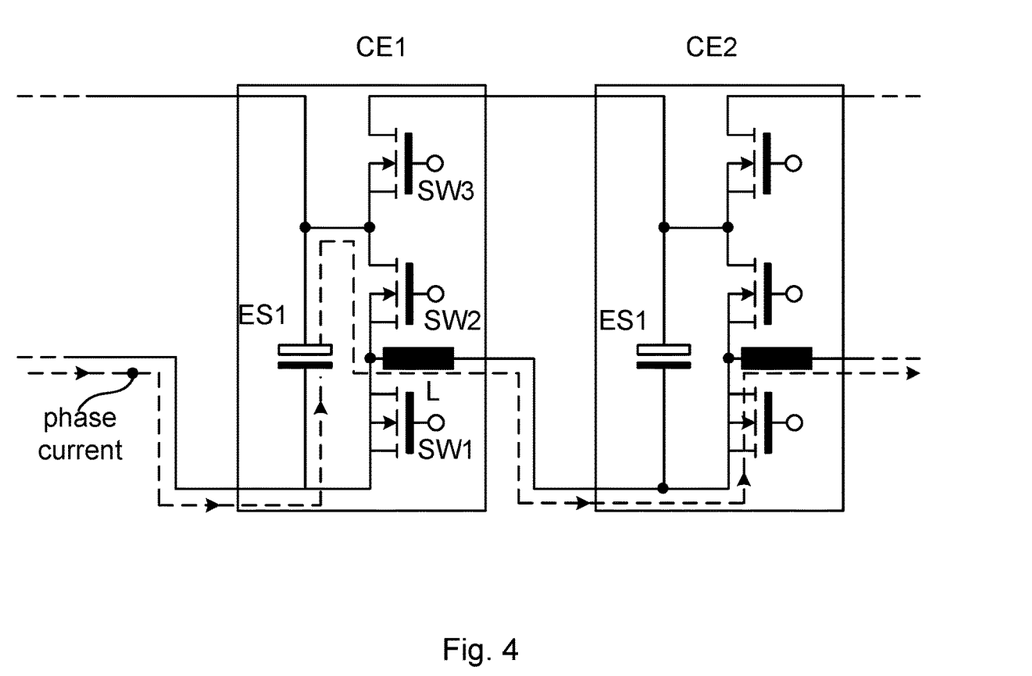

FIG. 4 shows the same two cells CE1 and CE2, where the first cell CE1 is in the waveshape contribution mode for the same current direction. Here the second switch SW2 of the first cell CE1 is turned on and the first and third switches SW1 and SW3 of the first cell CE1 are turned off. It can be seen that the phase current enters the first cell CE1 at the first cell terminal TE1 and then passes through the first energy storage element ES1, the second switch SW2, the inductor L and then continues via the third cell terminal TE3 to the second cell CE2. As the first switch SW1 is turned off and the second switch SW2 is turned on in the first cell CE1, the voltage of the first energy storage element ES1 will contribute to the waveshape on the secondary connection port. This is sometimes referred to as the first cell CE1 being inserted. It can also be seen that due to the first and third switches SW1 and SW3 being turned off, there is no discharging or energy transfer loop.

It can thereby also be seen that the second switch is controllable to cause the cell to contribute the voltage of the energy storage element to the forming of the output waveshape on the corresponding secondary connection port.

As can be seen in FIG. 3, the first and third switches SW1 and SW3 of the second cell CE2 were also turned on, which means that also this second cell CE2 is in the bypass and energy discharging mode. It can also be seen that this fact does not stop or impede the discharging of the first cell CE1. It is realized that also if the second cell was operating in a waveshape contribution mode, there would be no influence on the discharging mode of the first cell CE1.

The first and second switches SW1 and SW2 may be sinusoidally modulated in a complementary manner, while the third switch SW3 may be operating in synchronous rectification mode.

The utilized inductor L in each cell has two functions as follows:
   current limiter as it limits the rate of change of the energy transfer current from one cell to another;
   output ac filter as it filters the output current.

In the control of the converter cells performed by the control unit 12, the cells are selected to contributing to the forming of the waveshape on the secondary connection port through the control unit 12 turning on the second switches SW2 of these cells. The other cells are in the bypass and energy discharge mode in which case a charge is moved from one cell to the following cell in the stack, while the cell being discharged is also being bypassed with regard to the forming of the waveshape. This is done through the control unit 12 turning on the first and the third cells SW1 and SW2 of the cells in the stack operating in the bypass and energy discharging mode. As can be understood from FIG. 1, the charge being moved from the last cell ends up at the secondary connection port. As can also be seen in FIG. 1, the third switch SW3 of this last cell is not necessary for this transfer. It may therefore, as was mentioned earlier, be removed or omitted. The inductor L of the last this cell is furthermore acting as a filter only and can also be eliminated if no extra filter inductor is needed.

If n cells are provided that can participate in the forming of a waveshape, it can then be seen that the control unit may control a number k cells of a stack to contribute to the forming of a waveshape on the corresponding secondary connection port. It would then also control a number (n-k) cells in the stack to refrain from contributing to the waveshape and to discharge the energy storage element to the following cell or the corresponding secondary connection port.

It can in this way be seen that a charge is moved from the primary connection port through a stack to the secondary connection port while a waveshape is also formed on the secondary connection port.

In the three-phase converter 10 shown in FIG. 1, which may be considered as a Boost MMC (BMMC), each phase acts as an independent current source with a common ground at one side, where an ac output is obtained differentially between the phases. The bottom cells of the three phases are paralleled and connected to an input dc source.

It is worth noting that since the energy is transferred from one cell to another one, higher ac voltage can be obtained by increasing the number of cells per each phase. Thus, redundant cells can be added in order to further boost the input voltage if needed as in photovoltaic systems for example. Meanwhile, if the input voltage is high enough, those redundant cells can be bypassed to minimize the converter losses and operate at higher modulation index. The three-phase BMMC can be modulated using any modulation scheme such as the space vector modulation (SVM) scheme. It is also possible to use level shifted carriers with the SVM reference signals.

In the example above the current direction was from the primary connection port to the secondary connection port of a stack. The phase current thus entered a cell through the first cell terminal TCE1 and left the cell through the third cell terminal TCE3. It is possible that the opposite current direction is also desired to be used, i.e. that the phase current passes through a stack of the converter 10 from the secondary connection port to the primary connection port and thereby also passing through a cell from the third cell terminal TE3 to the first cell terminal TE1.

Figure 5:
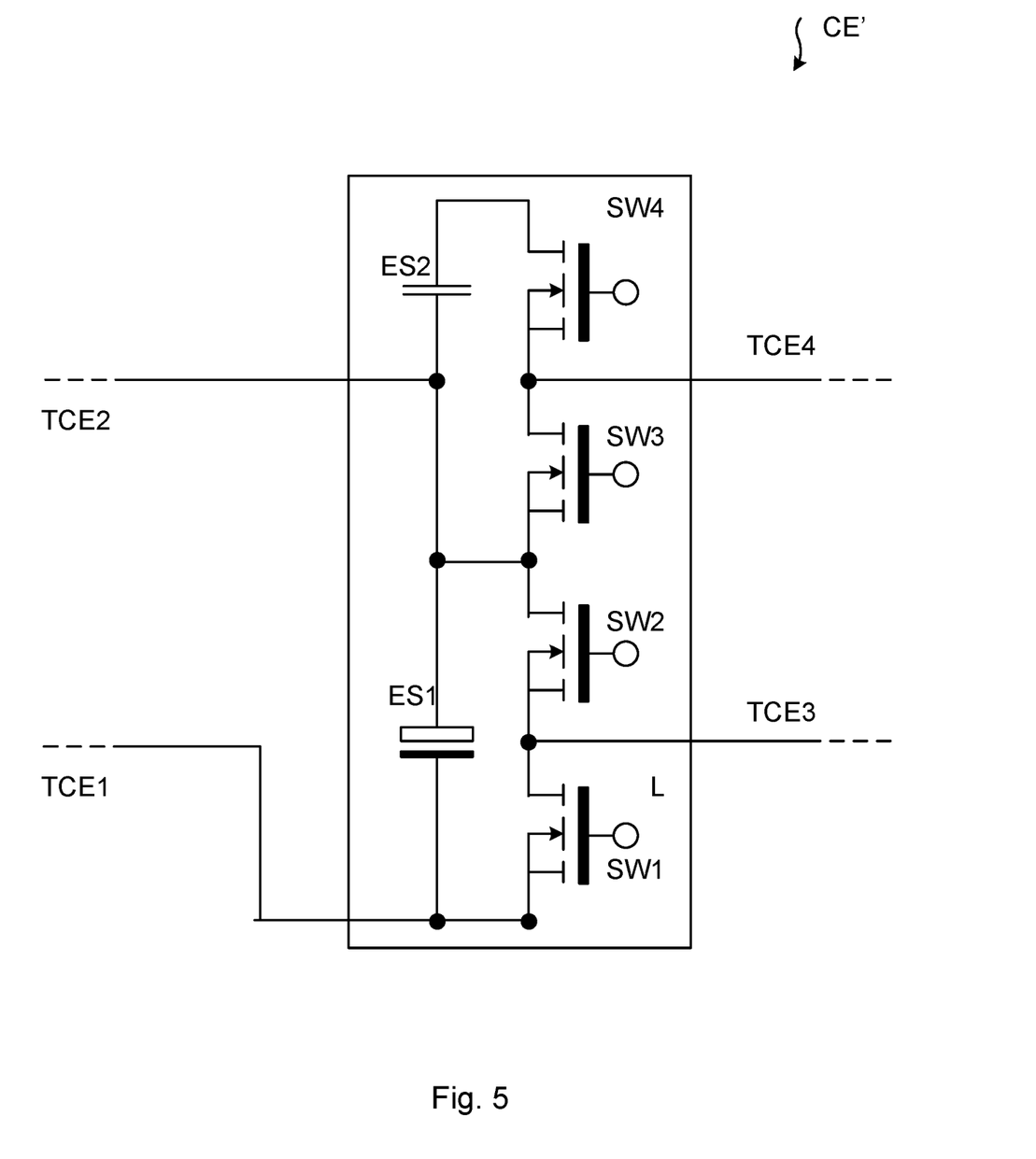

A cell CE' that is able to achieve this type of bidirectional operation is schematically shown in FIG. 5. This cell is similar to the cell in FIG. 2. However, in this case the string of switches further comprises a fourth switch SW4 and the string of energy storage elements further comprises a second energy storage element ES2, where the fourth cell terminal TCE4 is provided at a junction between the third and fourth switches SW3 and SW4, the second energy storage element ES2 is connected to the junction between the first energy storage element ES1, the second switch SW2 and the third switch SW3 as well as being connected to the fourth switch SW4. A first end of the second energy storage element ES2 is more particularly connected to the second end of the first energy storage element ES1, a first end of the fourth switch SW4 is connected to the second end of the third switch SW3 and the second ends of the second energy storage element ES2 and the fourth switch SW4 are interconnected.

Thereby at least the first (n−1) cells in a stack and with advantage all cells of the stack comprises the fourth switch and the second energy storage element, Under this modification an active clamp is combined with the floating third switch SW3. This active clamp comprises the fourth switch SW4 and the second energy storage element ES2, where those two elements are partially rated for free-wheeling operation. Note that in this case, the first and third switches SW1 and SW3 have the same control signal, while the second and fourth switches SW2 and SW4 are their complementary.

Figure 6:
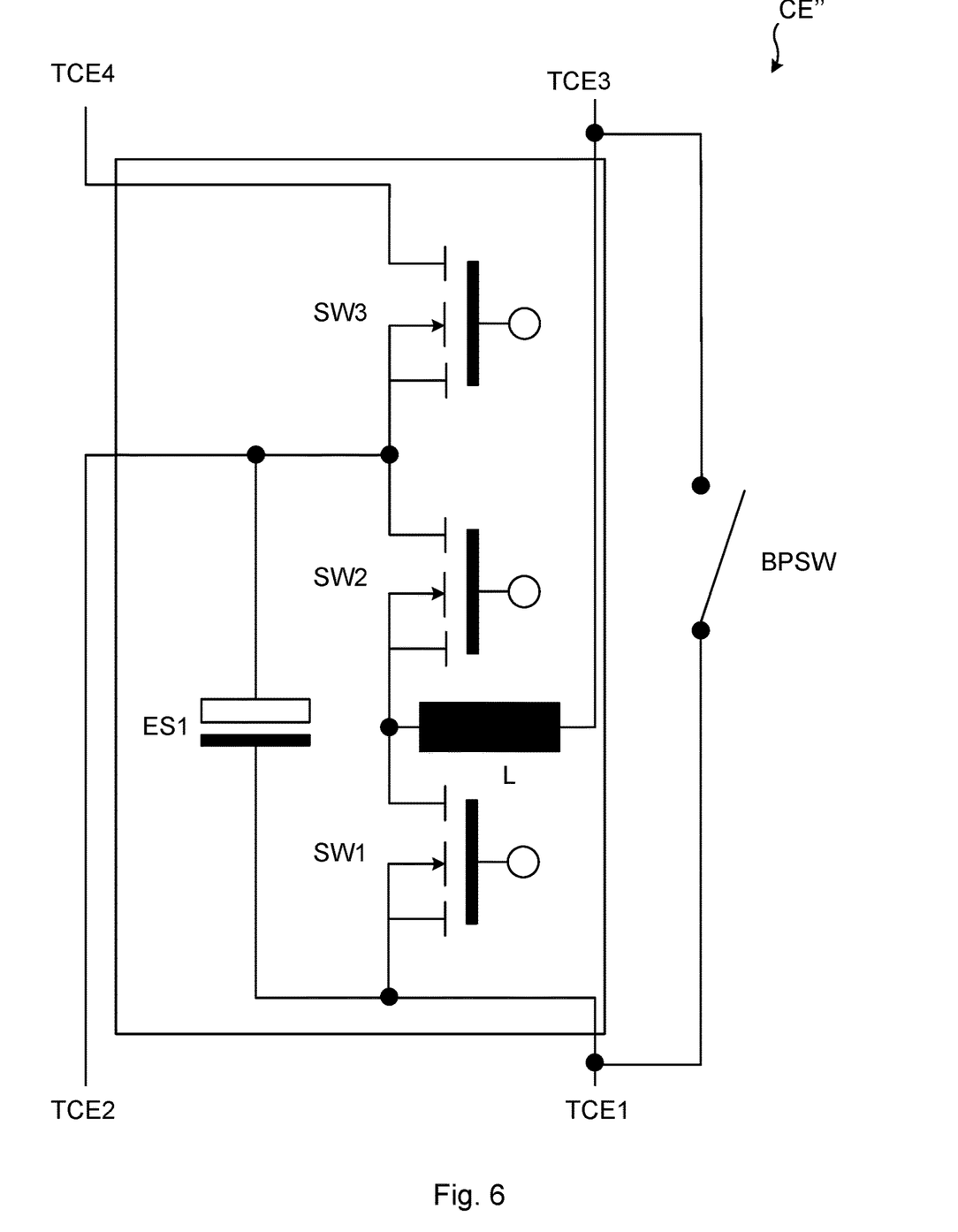

A further modification CE″ of the cell in FIG. 2 is shown in FIG. 6, where a bypass switch BPSW is connected between the first and third cell terminals TCE1 and TCE3. When this switch is BPSW turned on, the first and third cell terminals TCE1 and TCE3 are interconnected and thereby the cell CE″ is bypassed. This may be used for bypassing the cell CE″, for instance in case it is faulty. The bypass switch may be mechanical. However, it is also possible with an electronic or semiconductor switch, such as a transistor switch.

Through the invention a reliable, modular, compact, redundant, and efficient converter is obtained. The converter avoids the separation into a boosting stage and a converting stage. Moreover, the converter is also modular and this provides flexibility in that the adaption to different voltage levels in a simple way. Furthermore, as also the output ac filter inductor is distributed among the cells further modularity is introduced. This also avoids or limits the need for additional filtering on the ac side of the converter. Through the modularity, redundancy can also easily be introduced. As there is only one stage, the efficiency is also good.

The proposed boost modular multilevel converter (BMMC) is an innovative configuration for interfacing ac systems with the different low voltage (LV) dc systems, such as fuel cells, batteries and Photo Voltaic (PV) systems.

The secondary terminals may be connected to a load such as a motor drive. It may also be connected to applications that use ac grid connections, such as uninterruptible power supply (UPS) systems.

The converter may as an example be provided in an electric vehicle where multiphase machines are powered by batteries or fuel cells.

The switches may with advantage be of low voltage type and realized by metal oxide semiconductor field effect transistor (MOSFET) or Gallium nitride (GaN). However, also other alternatives are possible, such as: junction field effect transistor (JFET) switches or switches based on insulate-gate bipolar transistors (IGBT) with anti-parallel diodes. The energy storage elements may be capacitors. They may for instance be LV electrolytic capacitors. However, also batteries are possible.

The control unit may be realized as a processor acting on computer program code. This computer program code may be provided with the processor in a dedicated circuit, such as a Field-programmable Gate Array (FPGA) or an Application Specific Integrated Circuit (ASIC). However, the processor may also act on computer program instructions or computer program code in a program memory. The computer program instructions or computer program code may additionally be provided on a data carrier, which performs the functionality of the control unit when loaded into such a processor or a computer.

The waveshape may with advantage be a sinusoidal waveshape. However, also other shapes can be used. It may also comprise harmonics. In case of three stacks, then each stack may provide one out of three phases of an AC waveshape. It is also possible that fewer than three stacks are used. It is for instance possible with only one or two stacks. It is also possible with more stacks.

This converter has the following merits:
Flexible boosting capability with possibility of high-voltage gains;
Multilevel operation, where the number of the levels is proportional with the boosting ratio;
Redundant cells can be utilized;
Redundant cells can be utilized in order to maintain high modulation index under different conditions and to achieve maximum power point tracking in PV systems.

In case LV MOSFETs and LV electrolytic capacitors are used, the converter may be made at low cost. In this case the converter may also have a high efficiency due to the low ON-state resistance of the LV MOSFETs.

From the foregoing discussion it is evident that the present invention can be varied in a multitude of ways. It shall consequently be realized that the present invention is only to be limited by the following claims.

The invention claimed is:

1. A converter converting between a dc voltage at a first voltage level and at least one waveshape at a second higher voltage level, the converter having:
    a primary connection port for the dc voltage,
    one secondary connection port for each waveshape, and
    one stack of cells for each secondary connection port of the converter, where each stack comprises n cells connected in cascade between the primary connection port and the corresponding secondary connection port,
where at least (n−1) of the cells in each stack have:
    a first, second, third, and fourth cell terminal, where the first and second cell terminals are closer to the primary connection port than the third and fourth cell terminals,
    a string of energy storage elements comprising a first energy storage element, and
    a string of switches comprising a first, second, and third switch,
    where the first energy storage element is connected in parallel with the first and second switches, the first cell terminal is provided at a junction between the first energy storage element and the first switch, the second cell terminal is provided at a junction between the first energy storage element, the second switch and the third switch, a junction between the first and second switches is connected to the third cell terminal, and the third switch is connected to the fourth cell terminal,
    wherein the primary connection port is connected to the first and second cell terminals of the first cell of each stack and the secondary connection port of each stack is formed between the third cell terminal of the last cell in the stack and ground, and
    wherein there are three stacks each connected between the primary connection port
and the corresponding secondary connection port, wherein the first cell terminals of the first cells in each stack are interconnected and the second cell terminals of the first cells in each stack are interconnected.

2. The converter according to claim 1, wherein the last cell in each stack only comprises the first, second, and third cell terminals and only comprises the first and second switches in the string of switches.

3. The converter according to claim 1, wherein at least the first (n−1) cells in at least one of the stacks further comprise an inductor connected between the third cell terminal and the junction between the first and the second switches.

4. The converter according to claim 1, wherein the string of switches of at least the first (n−1) cells in at least one of the stacks further comprise a fourth switch, and wherein the string of energy storage elements of the at least the first (n−1) cells further comprises a second energy storage element, where the fourth cell terminal is provided at a junction between the third and fourth switches, the second energy storage element being connected to the junction between the first energy storage element, the second switch and the third switch as well as being connected to the fourth switch.

5. The converter according to claim 1, wherein in the string of switches of at least one of the cells in at least one of the stacks, the first switch is controllable to disable contributions from the first energy storage element in the forming of the waveshape on the corresponding secondary connection port and the third switch is controllable to discharge the first energy storage element into the first energy storage element of the following cell.

6. The converter according to claim 5, wherein in said at least one of the cells, the disabling of contributions in the forming of the waveshape on the corresponding secondary connection port and the discharging of the energy of the first energy storage element into the first energy storage element of the following cell are made when the first and third switches are turned on.

7. The converter according to claim 1, wherein in the string of switches of at least one of the cells in at least one of the stacks, the second switch is controllable to cause said at least one of the cells to contribute a voltage of the first energy storage element to the forming of the waveshape on the corresponding secondary connection port.

8. The converter according to claim 7, wherein in said at least one of the cells, the forming of the waveshape is made when the second switch is turned on.

9. The converter according to claim 7, wherein in said at least one of the cells, the control of the second switch is complimentary to the control of the first switch.

10. The converter according to claim 1, wherein at least one cell in at least one of the stacks further comprises a bypass switch connected between the first cell terminal and the third cell terminal and controllable to bypass the at least one cell in case the at least one cell is faulty.

11. The converter according to claim 1, further comprising a control unit controlling a number k of the cells of at least one of the stacks to contribute to the forming of the waveshape on the corresponding secondary connection port and to control a number (n−k) of the cells in said at least one of the stacks to refrain from contributing to the waveshape and to discharge the first energy storage element to the following cell or the corresponding secondary connection port.

12. The converter according to claim 1, wherein the third cell terminal of at least one of the cells in at least one of the stacks is connected to the first cell terminal of the following cell in said at least one of the stacks, and wherein the fourth cell terminal of said at least one of the cells is connected to the second cell terminal of the following cell in said at least one of the stacks.

13. A cell for use in at least one of three stacks of cells of a converter converting between a dc voltage with a first voltage level at a primary connection port and at least one waveshape with a second higher voltage level at a corresponding secondary connection port, the cell having:
a first, second, third, and fourth cell terminal, where the first and second cell terminals are closer to the primary connection port than the third and fourth cell terminals,
a string of energy storage elements comprising a first energy storage element, and
a string of switches comprising a first, second, and third switch,
where the first energy storage element is connected in parallel with the first and second switches, the first cell terminal is provided at a junction between the first energy storage element and the first switch, the second cell terminal is provided at a junction between the first energy storage element, the second switch and the third switch, a junction between the first and second switches is connected to the third cell terminal, and the third switch is connected to the fourth cell terminal,
wherein the primary connection port is connected to the first and second cell terminals of the first cell of each stack and the secondary connection port of each stack is formed between the third cell terminal of the last cell in the stack and ground, and
wherein the three stacks are each connected between the primary connection port and the corresponding secondary connection port, wherein the first cell terminals of the first cells in each stack are interconnected and the second cell terminals of the first cells in each stack are interconnected.

14. The cell according to claim 13, further comprising an inductor connected between the third cell terminal and the junction between the first and second switches.

15. The cell according to claim 13, wherein the string of switches comprises a fourth switch and the string of energy storage elements comprises a second energy storage element, where the fourth cell terminal is provided at a junction between the third and fourth switches and the second energy storage element is connected to the junction between the first energy storage element, the second switch and the third switch as well as being connected to the fourth switch.

16. The cell according to claim 13, wherein in the string of switches, the first switch is controllable to disable contributions from the first energy storage element in the forming of the waveshape on the corresponding secondary connection port and the third switch is controllable to discharge the first energy storage element into the first energy storage element of the following cell.

17. The cell according to claim 13, wherein in the string of switches, the second switch is controllable to cause the cell to contribute a voltage of the first energy storage element to the forming of the waveshape.

18. The cell according to claim 13, further comprising a bypass switch connected between the first cell terminal and the third cell terminal and controllable to bypass the cell in case the cell is faulty.

* * * * *